Figure 1:
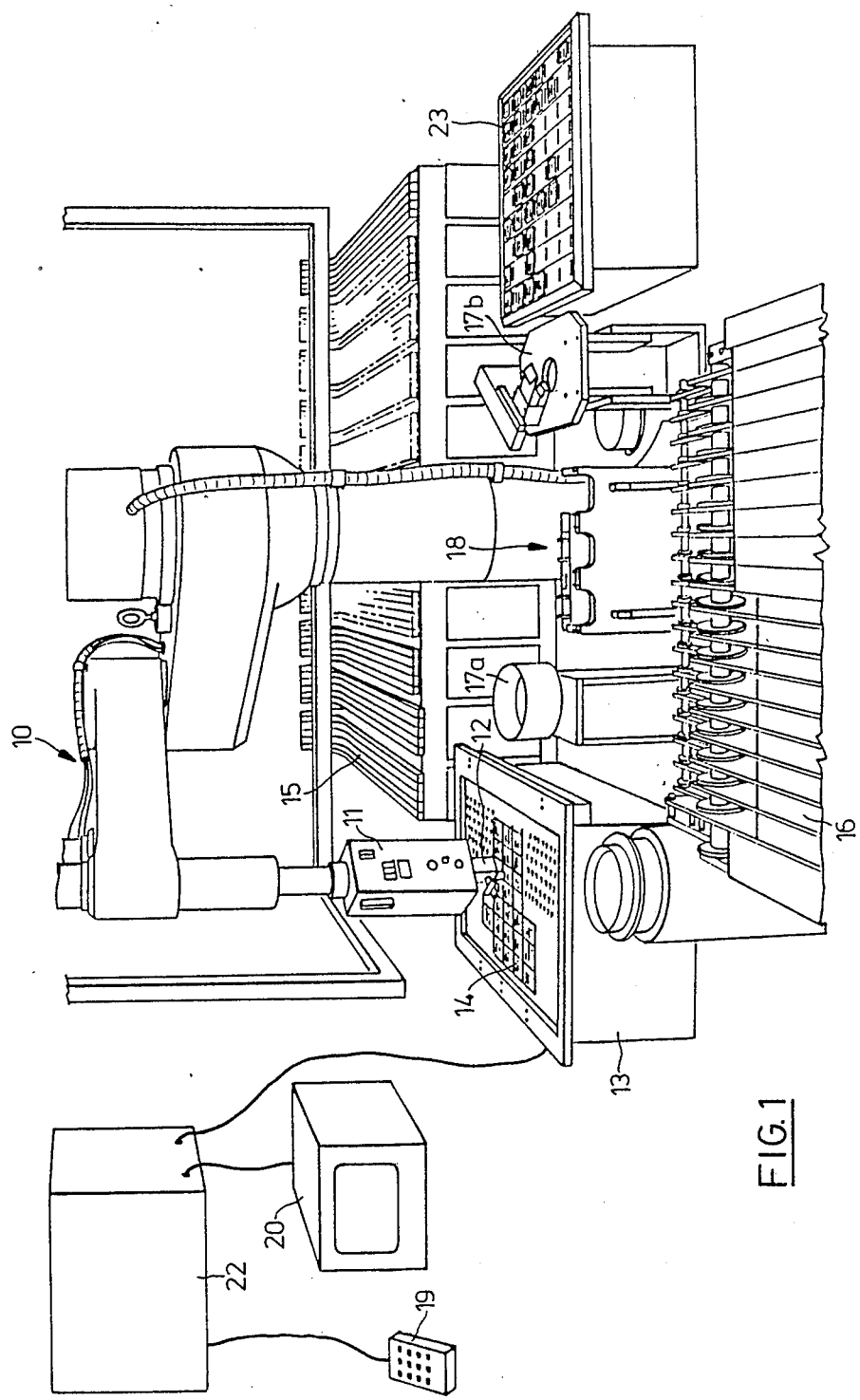

United States Patent [19]

Fule

[11] Patent Number: 4,922,434
[45] Date of Patent: May 1, 1990

[54] LINEAR INTERPOLATION FOR A COMPONENT PLACEMENT ROBOT

[75] Inventor: Andras G. Fule, Mississauga, Canada

[73] Assignee: Control Data Corporation, Minneapolis, Minn.

[21] Appl. No.: 207,691

[22] Filed: Jun. 16, 1988

[30] Foreign Application Priority Data

May 25, 1988 [CA] Canada .................................... 567596

[51] Int. Cl.$^5$ ............................................. G06F 15/46
[52] U.S. Cl. ...................................... 364/513; 29/740; 29/759; 358/101; 364/491; 364/559; 901/45; 901/57; 318/568.15; 318/573
[58] Field of Search ................ 364/513, 468, 488–491, 364/559, 474.31; 318/640, 573, 568.11, 568.15; 358/101, 107; 356/399–401; 901/45, 47; 29/703, 740, 759, 832, 833, 834; 382/8

[56] References Cited

U.S. PATENT DOCUMENTS

| | | | |
|---|---|---|---|
| 4,342,090 | 7/1982 | Caccoma et al. | 364/559 X |
| 4,628,464 | 12/1986 | McConnell | 364/491 X |
| 4,641,257 | 2/1987 | Ayata | 364/559 |
| 4,720,635 | 1/1988 | Uga | 364/559 X |
| 4,723,221 | 2/1988 | Matsuura et al. | 364/559 |
| 4,737,845 | 4/1988 | Susuki et al. | 901/47 X |
| 4,780,617 | 10/1988 | Umatate et al. | 364/559 X |

*Primary Examiner*—Joseph Ruggiero
*Attorney, Agent, or Firm*—Smart & Biggar

[57] ABSTRACT

Linear interpolation is applied to each pair of placement coordinates in a data driven surface mount component placement robot in order to eliminate component misplacement due to board artwork dimensional inaccuracies. The linear interpolation algorithm is derived by measuring the actual dimensions of the artwork of a given board by an integrated vision system via a camera attached to the robot arm.

4 Claims, 3 Drawing Sheets

LINEAR INTERPOLATION FOR A COMPONENT PLACEMENT ROBOT

The present invention relates to robotic component board assembly systems, in which the robot automatically selects the proper component and places it onto the corresponding pre-assigned component site on the specified board.

A printed circuit board comprises artwork in the top suface of a fiberglass or G4 substrate. The artwork includes "footprints" which are pre-assigned sites on the board comprising a configuration of solder pads matching the configuration of the leads or pads of various electronic components. In the process of manufacturing a printed circuit board, the artwork may shrink or expand with respect to its nominal dimensions due to shrinkage or expansion of the board which carries it, or due to other inaccuracies in the system for printing the artwork on the board.

When the physical dimensions of a printed circuit board are large (e.g. 16×12 inches), even small dimensional differences between the artwork on different boards (e.g. +/−5 mils across the artwork) may cause misplacement of components in a robotic component placer system.

A robotic component assembly system may use taught points for placing or inserting components, in which case the points are generated using a so-called Master board. If the physical dimensions of the artwork on an acutal board is different from those of the Master board, the components will be misplaced by the robot. As an alternative to using taught points, the system may be data driven from the CAD data used to design the board. The same problem exists with the CAD data driven robots: the placement coordinates are nominal, but in case of deviation in the physical dimensions of the artwork of an actual board from nominal dimensions, the components are going to be misplaced by the robot.

There have been several attempts in the prior art for ensuring accurate component placement. For example, U.S. Pat. No. 4,681,452 to Watanabe issued July 21, 1987 describes an automatic component inserter, where the displacement of the insertion holes from a nominal value for a through-the-board leaded component is detected by light projected by the placement head and detected by a sensor under the individual holes. The actual board position is adjusted manually, until maximum light is sensed through the holes, and this information is stored as a taught point for the X-Y positioning table. The same procedure must be repeated for every single component, or at least for quite a few stategically chosen ones. The technique will work only for through-the-board components, and the process is very tedious, since it has to be done for every board. Peterson, in U.S. Pat. No. 4,651,203 issued May 17, 1987 describes a video controlled article positioning system to accurately place each component. The technique of individually aligning each component would be extremely slow if applied to a printed circuit board where 300 to 400 components have to be placed.

U.S. Pat. No. 4,342,090 issued July 27, 1982 to Caccoma discloses a batch chip placement device. A camera takes a picture of two artwork registration marks on a board and compares the distance therebetween with the nominal distance to develop an interpolation factor. A row of chips is then transferred to a device called a "batch compensator" which adjusts the spacing between the row of chips so that this spacing takes the interpolation factor into account. The "batch compensator" may also translate the row of chips in order to take the interpolation factor into account in the second dimension of the two dimensional board. The row of chips is then picked up by a vacuum pencil assembly and removed to the board. Caccoma's "batch compensator" is a complicated mechanical device requiring servos to allow merging and translation of rows of chips prior to their placement.

The subject invention provides an accurate system for the placement of components on a circuit board which avoids the drawbacks of the prior art.

According to the present invention there is provided a component placement system for the positioning of components at pre-assigned sites on a component board having registration marks, comprising: a robot arm; a component board mounting station; storage means for storing registration mark nominal distance data representing the nominal distance between at least one pair of said registraton marks and nominal component site data representing the nominal position of said pre-assigned sites on said component board; opticla means for generating signals at the nominal osition of said registration marks on said component board; interpolation determination means responsive to said signals from said optical means and said registration mark nominal distance data for determining a measured distance between said at least one pair of said registration marks and for comparing said measured distance with the corresponding nominal distance between said at least one pair of said registration marks in order to develop at least one interpolation factor; correction means for applying said at least one interpolation factor to said nominal component site data in order to generate corrected data, and placement control means for controlling said robot arm to pick up components and place them on said component board in accordance with said corrected data.

Figure 2:
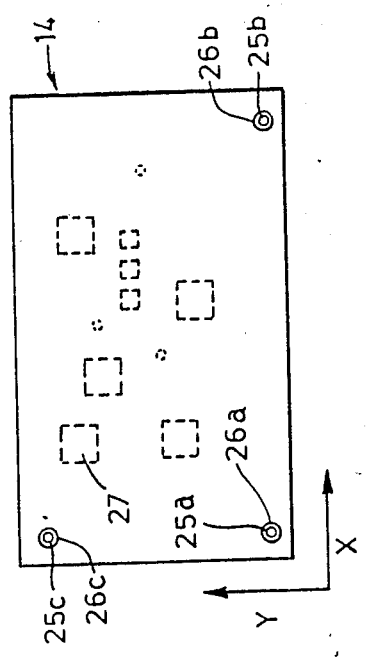
Figure 3:
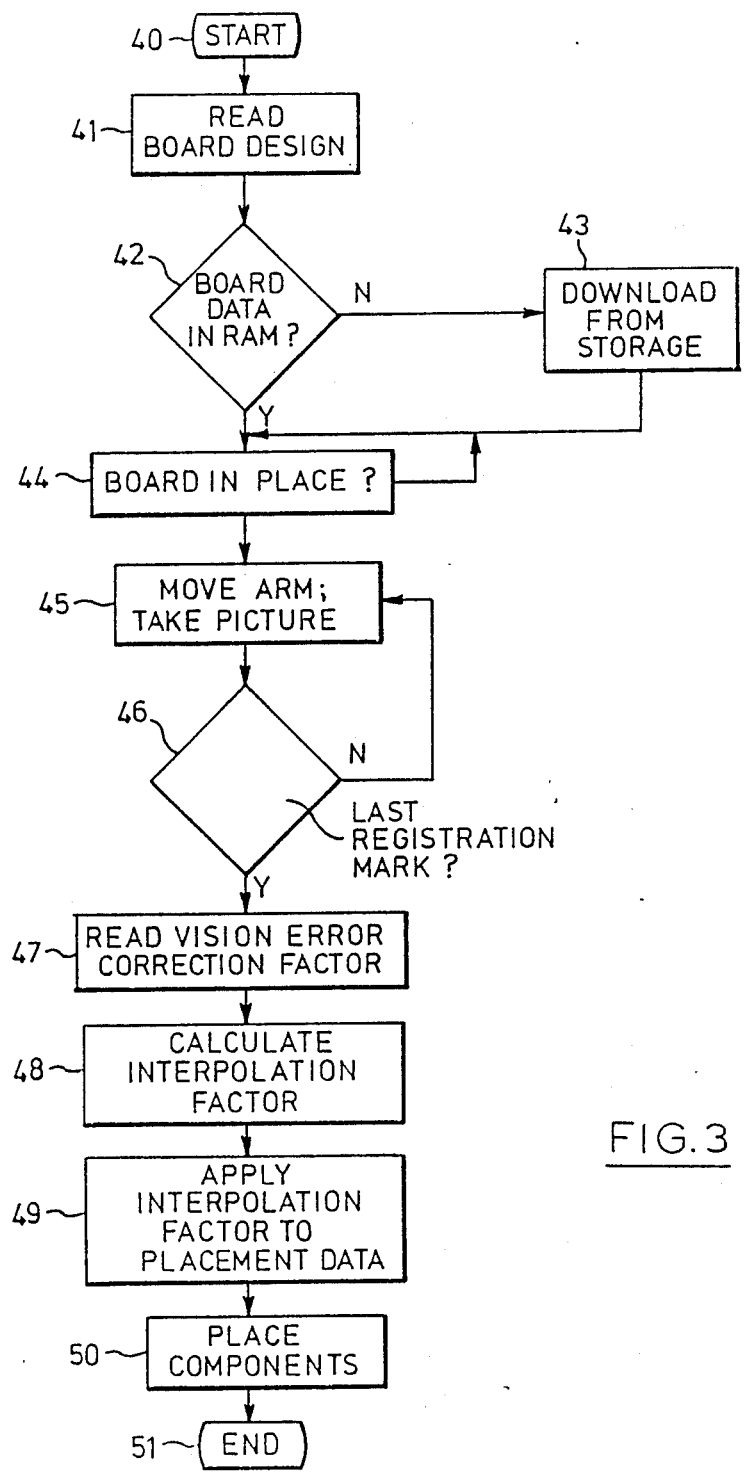

In the Figures which disclose an example embodiment of the subject invention:

FIG. 1 is perspective view of a robotic system incorporating the subject invention, FIG. 2 is a plan view of a sample printed circuit board prior to placement of components thereon, and FIG. 3 shows a flow chart for the operation of the controller the subject invention.

In FIG. 1, an off-the-shelf robot arm is indicated generally at 10. Grippers 12 and an optical means comprising two cameras 11 are mounted at the operative end of the robot arm. A component board mounting station is shown in the robotic work cell at 13 with component board 14 mounted thereon. A bank of vibratory linear feeders is indicated at 15, a bank of tape feeders at 16 and a tray for components a 23. The work cell also includes two fixed cameras 17a and 17b and a gripper selection station 18. An operator pendant (or keypad) 19 is connected to a robot controller is also operatively connected to the robot arm 10 and operator terminal 20.

The robot controller comprises the following: a computer which executes instructions of the Application Programme and controls all movements of the robot arm; memory storage which holds the robot operating system, the Application Software and the placement files (each placement file includes coordinate data for the placement of components on a board of a particular design type); hard storage (that is, floppy and hard disks) for permanent storage of the data in the memory storage; and a vision system with its own computer and memory which drives the optical means 11 and cameras 17a and 17b in the workcell and which executes and controls all of the optical data information processing and is fully integrated with the robot.

A suitable robot with an integrated vision system is the AdeptOne* robot with the Apapt XGS Vision System* of Adept Technology, San José, Calif.

*a trademark

A simplified top view of component board 14 is shown in FIG. 2. Component board 14 is a printed circuit board. The board includes three tooling holes 25a, 25b, and 25c. The tooling holes allow the board to be mounted on tooling pins (not shown) at the mounting station 13 of FIG. 1. The artwork of the board includes three registraton marks which are rings 26a, 26b, and 26c. The rings are substantially concentric with the tooling holes. A notional line through the centres of rings 25a and 25b defines the X direction on the board and a notional line through the centres of rings 25a and 25b define the (perpendicular) Y direction on the board. The registration marks are part of the artwork itself and are not applied by a different technique, such as silk screening. Thus, the actual distance between the rings will reflect any shrinkage or expansion of the artwork. The artwork of the board also comprises component sites or "footprints", one of which is indicated at 27. The design of the artwork on the board determines the board design type.

In operation, the readings from the vision system of state-of-the-art robots while repeatable, have an accuracy in the same range as the accuracy requirement for successfully placing components at their pre-assigned sites. Consequently, the errors in the readings of the robot vision system are not negligible. Thus, preferably these readings should be adjusted to account for this error and this may be done utilising standard calibration techniques. More specifically, the actual error of the vision system can be determined by measuring the artwork ring distances inboth X and in Y directions repeatedly using the robotic vision system, then, using the same printed circuit board, measuring the same distances with any accurate measuring meachine (MM) such as a Coordinate Measuring Machine or a laser inferometer, having at least $+/-0.0005$ mil accuracy. Hence, in order to calculate a vision error correction factor, a board, such as the one illustrated in FIG. 2, may be mounted in an accurate measuring device and the measuring device then measures the distance between the registration rings in the X and Y directions repeatedly. By way of example, let it be assumed that the means distance measured between rings 26a and 26b is 15.2040 inches and the mean distance between rings 26a and 26c is measured as 10.6535 inches. The former mean distance will be a measurement in the X direction which will be designed X(MM) and the later distance will be a mean measurement with Y direction, or Y(MM). Let it further be assumed that for the same board the robotic vision system measures the following mean distance between marks 26a and 26b (the X direction distance): 15.205 inches. Further, let it be assumed that the robotic mean measured value of the distance between marks 25a and 25c (the Y direction) for the board is 10.655 inches.

The errors in the vision system are therefore as follows:

X(vision error) = X(robot) − X(MM)
= 15.205 − 15.204 = 0.0010 inches.

Y(vision error) = Y(robot) − Y(MM)
= 10.655 − 10.6535 = 10.0015 inches.

After calculation, the vision errors are stored in the memory of robot controller 22. The vision error correction factor need only be determined from time-to-time in order to calibrate the robot.

With reference to FIG. 3, in order to place components on a board, a board is mounted at mounting station 13 and the operator keys in a request to place components (which sends programme control to START block 40) and the board design type. The computer of the controller 22 then reads the board design type (block 41) and determines whether the placement file for the particular board is in RAM (block 42). If no, it downloads the placement file for the particular board design type from storage (block 43). The placement file is a data file for the board design type; this file includes nominal co-ordinate data for the component footprints and registration rings. Once the board data is in RAM, the computer of the controller checks for an indication that the board is in place and then causes robot arm 10 to position optical means 11 at the nominal position of registration mark 26a and take pictures at this location (block 45). This is repeated for artwork registration rings 26b and 26c (block 46). From these pictures, the computer calculates the distance measured by the robot between the registration rings in the X and Y direction. Assuming that the board is the same as that used in the example vision error correction factor determination, then the measurements will be as before, i.e.:

X(robot) = 15.205" and Y(robot) = 10.655"

The computer of the controller also has available the nominal distance between the registration marks from the board design data in the placement file. Assuming the nominal distance between registration rings 26a and 26b is 15.2 inches and the nominal distance between artwork registration rings 26a and 26c is 10.65 inches then:

X(nominal) = 15.200" and Y(nominal) = 10.650"

Finally, the computer determines the vision error correction factors simply by reading the current factors from the memory of robot controller 22 (block 47). It is assumed these are as in the foregoing example.

The interpolation factors may then be calculated by the computer as:

$$X(\text{interpol.}) = \frac{X(\text{robot}) - X(\text{vision error}) - X(\text{nominal})}{X(\text{nominal})}$$

$$= \frac{15.205 - 0.0010 - 15.200}{15.200} = \frac{0.004}{15.200}$$

$$= 0.0002631 \text{ inches}$$

$$Y(\text{interpol.}) = \frac{Y(\text{robot}) - Y(\text{vision error}) - Y(\text{nominal})}{Y(\text{nominal})}$$

$$= \frac{10.655 - 0.0015 - 10.650}{10.650} = \frac{0.0035}{10.650}$$

$$= 0.0003286 \text{ inches}$$

This process is illustrated at block 48.

The computer then applies the interpolation factors to the nominal placement data for a component (block 49) so that the X and Y coordinates to be used in the placement of the component are:

X(used) = X(nominal data) × [1 + X(interpol.)]
Y(used) = Y(nominal data) × [1 + Y(interpol.)]

For example, assuming that the nominal component placement coordinate set for a particular component is:

X(nominal data)=15.000 inches, and
Y(nominal data)=10.000inches
The placement coordinates to be used with the linear interpolation will be:
X(used)=15.000×[1+0.0002631]=15.003946 inches
Y(used)=10.000×[1+0.0003286]=10.003286 inches Control then passes to block 50 whereat the computer ensures the robot has the appropriate gripper from gripper selection station 18 and then sends control signals to the robot so that the robot takes up the appropriate component from one of the feeders 15 and 16 or tray 23 and (after correcting for any rotational misalignment of the component utilising cameras 17a and 17b and known techniques) places it at the corrected coordinate set. The computer repeats this process, from block 49, for successive components which are to be placed on the circuit board.

It can easily be seen that without linear interpolation, the component of the foregoing example would have been "underplaced" by approximately 4 mils in the X direction and by 3 mils in the Y direction by the robot on the example board. The adjustment depends totally on the actual board artwork dimensions, and works whether the tolerance is positive or negative. Furthermore, it compensates for the inaccuracy of the robot, since the vision system error was determined for the arm mounted camera on the robot.

While the foregoing invention has been described in connection with the use of three artwork registration rings, clearly other artwork markings could be used, such as appropriate artwork footprints. Further, while in the example embodiment the nominal distance between the registration rings was stored in the placement file, if only the nominal co-ordinates of these rings are stored therein, the nominal distance therebetween may be simply calculated and saved for comparison with the corresponding measured distance.

It will be appreciated that the invention described allows a robot to accurately place components with software control thus avoiding the need for a separate hardware element to compensate for variation in dimensions of the artwork of a board. The current invention provides an effective way of ensuring perfect component placement regardless of board tolerances. This is very important, since the current manufacturing processes can at best provide +/−3 mil accuracy on large multi-layer printed circuit boards.

The embodiments of the invention in which an exclusive property or privilege is claimed are defined as follows:

1. A component placement system for use with a component board of the type having component sites and at least two registration marks comprising:
 (a) a robot arm;
 (b) optical means associated with said robot arm for selectively generating signals;
 (c) a component board mounting station for mounting a component board of the type having component sites and at least two registration marks;
 (d) storage means for storing registration mark nominal position data representing the nominal location of said at least two registration marks, nominal distance data representing the nominal distance between at least one pair of registration marks, and nominal component site data representing the nominal position of said component sites on said component board;
 (e) optical control means for retrieving said registration mark nominal position data from said storage means, for moving said robot arm in response to said registration mark nominal position data so that said optical means is positioned over the nominal position of consecutive ones of said at least two registration marks when said component baord is mounted on said component board mounting station, and for causing said optical means to generate a signal at the nominal position of consecutive ones of said at least two registration marks;
 (f) interpolation determination means responsive to said signals from said optical means and said storage means for determining a measured distance between said at least one pair of registration marks and for comparing said measured distance with the corresponding nominal distance from said distance data for each of said at least one pair of registration marks in order to develop at least one interpolation factor;
 (g) robot arm control means for, for each component site on said board, applying said at last one interpolation factor to the nominal component site data associated with a particular component site in order to generate corrected component site data representing the actual position of said particular component site on said component board and for controlling said robot arm to pick up a particular component intended for said particular component site and to place said particular component on said component board at the position indicated by said corrected component site data for said particular component site.

2. The component placement system of claim 1 wherein said component board has three registration marks and wherein said registration mark nominal position data comprises data representing the nominal location of said three registration marks.

3. The component placement system of claim 2 wherein said at least one pair of registration marks comprises two pair of registration marks, each pair defining a line perpendicular to the line defined by the other pair.

4. A component placement system for the positioning of components at pre-assigned sites on a component board of the type having registration marks, comprising:
 (a) a robot arm;
 (b) a component board mounting station for mounting a component board of the type having pre-assigned sites and registration marks;
 (c) storage means for storing registration mark nominal distance data representing the nominal distance between at least one pair of said registration marks, nominal pre-assigned site data representing the nominal position of said pre-assigned sites on said component board, and a vision error correction factor;
 (d) optical means for generating signals at the nominal position of said registration marks on said component board;
 (e) interpolation determination means responsive to said signals from said optical means, said registration mark nominal distance data and said vision error correction factor for determining a measured distance between said at least one pair of said registration marks, for adjusting said measured distance with said vision error correction factor and for comparing said adjusted measured distance with the corresponding nominal distance between said at least one pair of registration marks in order to develop at least one interpolation factor;

(f) robot arm control means for, for each pre-assigned site on said component board, applying said at least one interpolation factor to the nominal pre-assigned site data associated with a particular pre-assigned site in order to generate corrected pre-assigned site data representing the actual position of said particular pre-assigned site on said component board and for controlling said robot arm to pick up a particular component intended for said particular pre-assigned site and to place said particular component on said component board at the position indicated by said corrected pre-assigned site data.

* * * * *